(12) United States Patent
Gomez

(10) Patent No.: US 9,182,095 B2
(45) Date of Patent: Nov. 10, 2015

(54) LIGHTING AND/OR SIGNALING MODULE FOR A VEHICLE COMPRISING A LIGHT GUIDE WITH A RIB AND A SUPPORT WITH MEANS OF ATTACHMENT COLLABORATING WITH THE RIB

(71) Applicant: Valeo Iluminacion Sociedad Anonima, Martos (ES)

(72) Inventor: Manuel Gomez, Jaen (ES)

(73) Assignee: Valeo Iluminacion Sociedad Anonima, Martos (ES)

( * ) Notice: Subject to any disclaimer, the term of this patent is extended or adjusted under 35 U.S.C. 154(b) by 45 days.

(21) Appl. No.: 14/045,434

(22) Filed: Oct. 3, 2013

(65) Prior Publication Data

US 2014/0098562 A1   Apr. 10, 2014

(30) Foreign Application Priority Data

Oct. 4, 2012   (FR) ...................... 12 59422

(51) Int. Cl.
*F21V 9/00* (2015.01)
*F21S 8/10* (2006.01)
*F21V 8/00* (2006.01)

(52) U.S. Cl.
CPC ........... *F21S 48/1329* (2013.01); *F21S 48/215* (2013.01); *F21S 48/2206* (2013.01); *F21S 48/2237* (2013.01); *F21S 48/2268* (2013.01); *F21S 48/236* (2013.01); *G02B 6/001* (2013.01); *G02B 6/0088* (2013.01)

(58) Field of Classification Search
CPC . F21S 48/1241; F21S 48/1329; F21S 48/215; F21S 48/2206; F21S 48/2237; F21S 48/2268; F21S 48/236; G02B 6/001; G02B 6/0088

USPC .................................................. 362/511, 555
See application file for complete search history.

(56) References Cited

U.S. PATENT DOCUMENTS

| 6,883,949 | B2 | 4/2005 | Goto et al. |
| 6,915,062 | B2 | 7/2005 | Hulse et al. |
| 6,984,062 | B2 | 1/2006 | Yeh |
| 7,614,772 | B2 | 11/2009 | Tamaki et al. |
| 7,953,312 | B2 | 5/2011 | Kabuki et al. |
| 8,142,061 | B2 | 3/2012 | Jablonski |

(Continued)

FOREIGN PATENT DOCUMENTS

| DE | 10332977 | 7/2005 |
| DE | 102007010023 | 9/2007 |

(Continued)

*Primary Examiner* — Jason Moon Han
(74) *Attorney, Agent, or Firm* — Jacox, Meckstroth & Jenkins

(57) ABSTRACT

The invention relates to a lighting and/or signaling module comprising a support, a light guide arranged in an enclosure of said support and a mask arranged on the support and extending in front of the light guide. The light guide comprises a longitudinal rib intended to collaborate by engaging with a series of hooks belonging to the support. The mask is intended to mask the mounting zones of the light guide. It comprises one or more windows intended to let through the rays of light emitted transversally by the light guide. The rib extends continuously over essentially the entire length of each of the windows. The rib allows simple, rapid and reliable attachment of the light guide to its support. The continuity of the rib among each of the windows means that the creation of any visible non-uniformity through said windows is avoided.

13 Claims, 2 Drawing Sheets

(56) References Cited

U.S. PATENT DOCUMENTS

| | | |
|---|---|---|
| 8,215,810 B2 | 7/2012 | Welch, Sr. et al. |
| 2003/0169997 A1 | 9/2003 | Hulse et al. |
| 2004/0052089 A1 | 3/2004 | Coto et al. |
| 2005/0254253 A1 | 11/2005 | Yeh |
| 2008/0002421 A1 | 1/2008 | Tamaki et al. |
| 2009/0003014 A1 | 1/2009 | Jablonski |
| 2009/0003784 A1 | 1/2009 | Kabuki et al. |
| 2010/0296302 A1 | 11/2010 | Welch, Sr. et al. |
| 2011/0242831 A1 | 10/2011 | Okui et al. |

FOREIGN PATENT DOCUMENTS

| | | |
|---|---|---|
| FR | 591717 | 7/1925 |
| FR | 2964917 | 3/2012 |
| WO | 2007065227 | 6/2007 |
| WO | 2009058723 | 5/2009 |

FIG.4
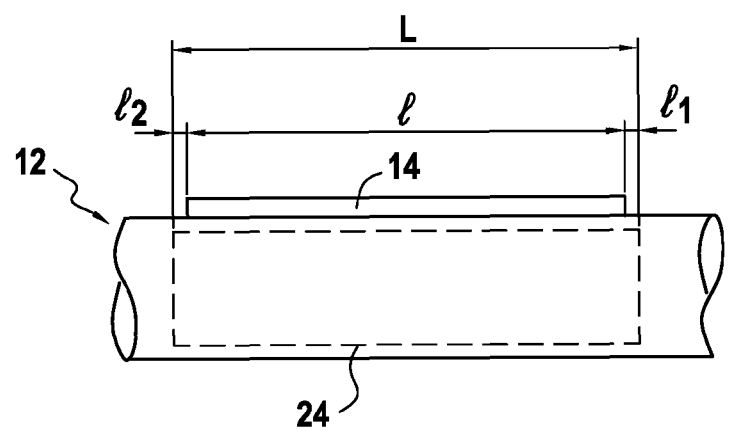
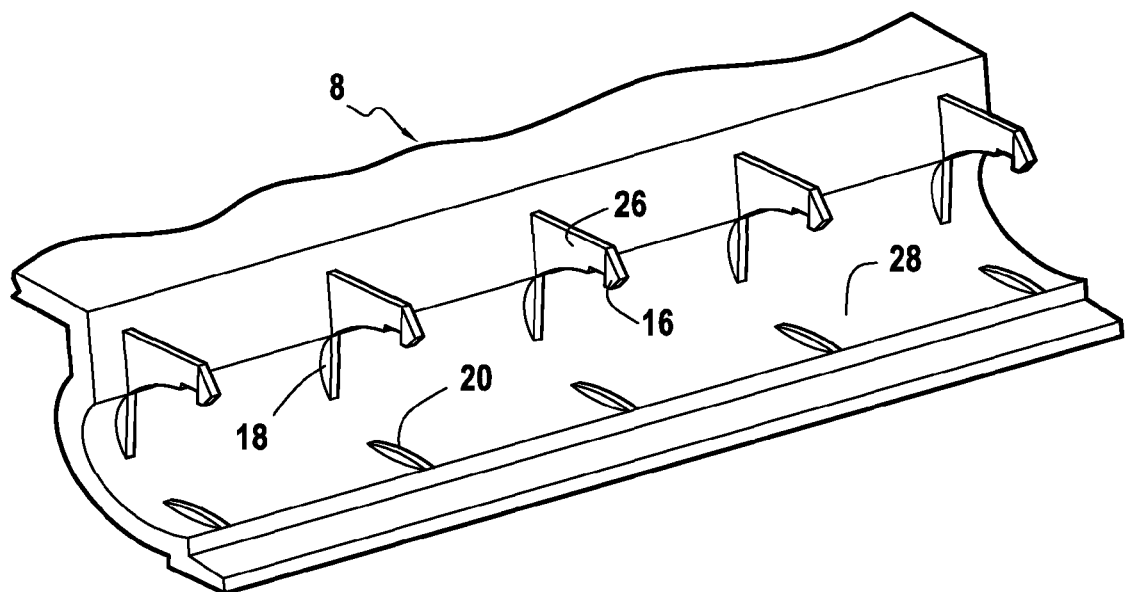
FIG.5

LIGHTING AND/OR SIGNALING MODULE FOR A VEHICLE COMPRISING A LIGHT GUIDE WITH A RIB AND A SUPPORT WITH MEANS OF ATTACHMENT COLLABORATING WITH THE RIB

CROSS-REFERENCE TO RELATED APPLICATIONS

This application claims priority to French Application No. 1259422 filed Oct. 4, 2012.

BACKGROUND OF THE INVENTION

1. Field of the Invention

The invention relates to a light guide for a lighting and/or signaling module, notably for a vehicle. The invention also relates to a support for such a light guide. The invention also relates to a lighting and/or signaling module comprising such a support and possibly such a guide arranged on the support.

2. Description of the Related Art

In the field of motor vehicle lighting and signaling, it is becoming increasingly commonplace for use to be made of optical waveguides. An optical waveguide is, very schematically speaking, an elongate element of transparent material, generally in the form of a cylinder. Near one of the ends of the guide, referred to as the input face of the guide, there is (or are) one (or more) light sources, for example a small-size light source of the light-emitting diode type: the rays of light emitted by this source travel by total reflection along the length of the guide toward its opposite end referred to as the terminal face of the guide. Some of the rays of light passing along the guide will emerge via the face referred to as the front face of the guide because of the presence of reflective elements arranged on the face, opposite to the previous face, referred to as the rear face of the guide. These reflective elements consist for example of prisms, forming reflective facets.

The guide thus emits light along its entire length. It has the advantage of being able to adopt very varied geometric shapes, of being straight or curved into an arc of a circle, and of conveying a lighting surface even to somewhat inaccessible regions of the vehicle light or headlamp. It thus makes a significant contribution toward the style of the light or of the headlamp. Depending on the overall shape of the guide or even on the length thereof, it may prove difficult to attach to the light or headlamp of the vehicle, particularly when there is a need to ensure that the guide maintains a uniform appearance over the entirety of its visible length.

Patent document DE 10 2007 010 023 A1 discloses a signaling device of the flashing indicator type intended to be incorporated into an external rear-view mirror of a vehicle. It comprises a light guide consisting of two elements which are elongate in two parallel longitudinal directions and connected to one another by a central part running along the elements. Lugs for attaching the guide to a support are provided at one of the two ends thereof. The support comprises two longitudinal enclosures which are parallel and of U-shaped overall section. Each longitudinal element of the guide is housed in one of these enclosures. The guide is thus held only by its two ends, the two parallel longitudinal elements being held in their respective enclosures with their exterior surface distant from the surface of the enclosure. This way of attaching the light guide is practicable for guides of short length, and in particular for multiple guides of greater rigidity, the issue being that for simple light guides, there is a risk that such attachment may pose problems, notably problems of uncontrolled contact between the surface of the guide and that of the enclosure.

U.S. Publication No. U.S. 2005/0254253 A1, now U.S. Pat. No. 6,984,062, discloses a vehicle headlamp equipped with two circular signaling modules, each one surrounding a lighting module. Each of these signaling modules comprises a longitudinal light guide of circular overall shape. It is housed in an enclosure, likewise circular and comprising notches intended to collaborate with fixing tabs extending rearward from the rear face of the guide. These tabs are generally flexible and provided with a positive-contact surface able to collaborate with the edge of the corresponding notch of the support. The enclosure is generally circular and of generally rectangular cross section open in such a way as to be able to accept the light guide the corresponding cross section of which is likewise approximately rectangular. The closed end of the enclosure comprises a series of openings intended to let out the rays of light emitted by the light source positioned behind the light guide. This module is fairly advantageous from the standpoint of its simplicity of construction. The fixing tabs do, however, influence the transmission of light. This effect is not excessively troublesome in the module configuration described therein because the enclosure has four openings feeding the guide with light and these are distributed about its circumference. The non-uniformities caused by the fixing tabs are thus reduced. In the case of a light guide fed only via one of its ends, or even by both, this solution does generate non-uniformities that do present a problem. In addition, this type of mounting requires contact between the rear face of the guide and the surface of the enclosure. The rectangular cross section of the guide and of the enclosure also constitute a limitation which may prove penalizing for other applications.

SUMMARY OF THE INVENTION

One objective of the present invention is to propose a light guide and a corresponding support which alleviates at least one of the above-mentioned disadvantages. More particularly, the objective of the present invention is to propose a light guide and a corresponding support which allows satisfactory attachment of the guide and provide satisfactorily uniform lighting along the length of the guide.

One subject of the invention is an optical light guide with a longitudinal direction and a cross section forming a closed general outline, the optical guide being made of a transparent material able to form a diopter with its environment and able to transmit and guide rays of light by multiple reflection off the diopter, the optical guide comprising a visible portion with means able to reflect transversally some of the rays passing along it so as to cause them to leave the guide; notable in that the optical guide comprises a continuous longitudinal rib on the visible portion of the guide, projecting from the general outline, the rib being intended to collaborate with a support so that the optical guide can be attached to the support.

The guide may have a plurality of ribs, for example several ribs aligned in one and the same longitudinal direction and/or several ribs distributed about the periphery of the cross section of the optical guide.

For preference, the overall outline of the cross section of the optical guide has a constant concavity over the entire outline. The overall outline disregards the rib.

According to one advantageous embodiment of the invention, the means able to reflect some of the rays transversally comprise a succession of reflective facets distributed longitudinally over a rear part of the surface of the visible portion of the optical guide, the means being able to reflect some of the rays of light passing along the guide so as to cause them to leave the optical guide through a front part of the surface, the rib being positioned on the overall outline of the optical guide in such a way as to be between the rear part and the rear part of the surface, preferably approximately mid-way between these two zones. The rib is thus ideally positioned to cause the least possible disturbance to the sets of reflections going on within the optical guide.

According to another advantageous embodiment of the invention, the rib has a quadrilateral-shaped overall section, preferably a rectangle the width and height of which are less than 10%, preferably 5%, more preferably still 3% of the mean dimension of the cross section of the element. The notably quadrilateral-shaped cross section may have rounded corners.

According to yet another advantageous embodiment of the invention, the rib is formed integrally with the optical guide, preferably by molding.

Another subject of the invention is a support for optical light guide of a lighting and/or signaling device, comprising a longitudinal enclosure able to receive the optical guide, wherein the optical guide is in accordance with the invention and the support comprises retaining means for holding the optical guide in the enclosure able to collaborate with the rib of the guide.

According to one advantageous embodiment of the invention, the retaining means comprise at least one positive-contact surface for positive contact with the rib able to hold the optical guide in the enclosure.

According to another advantageous embodiment of the invention, the retaining means comprise at least one arm, preferably a flexible one, supporting the positive-contact surface. For preference, the support comprises a series of arms distributed preferably uniformly along the longitudinal direction of the enclosure.

According to one embodiment of the invention, the arm or each arm comprises a hook and a flexible zone able to allow the hook to move as the guide is being inserted into its enclosure, each hook comprising a catching surface that catches on the rib of the light guide. According to one embodiment of the invention, this surface may be generally perpendicular to the direction in which the enclosure is open which essentially corresponds to the direction in which the guide is inserted into the enclosure. This surface thus forms a positive-contact surface for positive contact with the front surface of the rib of the guide.

According to another advantageous embodiment of the invention, at least one arm comprises a contact surface for contact with the rib of the guide as it is being inserted into the enclosure, the surface being inclined with respect to an overall direction in which the guide is inserted so as to allow the arm to move as the guide is being inserted into the enclosure so that the positive-contact surface can engage with the rib. In the embodiments in which the arm comprises a hook, it is the hook that has the inclined contact surface, thus allowing the guide to be inserted further, until the inclined surface leaves the surface of the rib and until the contact surface becomes positioned in front of the front surface of the rib, thus ensuring that the guide is retained or held in its enclosure.

According to yet another advantageous embodiment of the invention, the enclosure comprises at least one supporting surface for the guide, the supporting surface being generally opposite the retaining means for retaining the guide. For preference, the enclosure comprises a plurality of supporting surfaces distributed, preferably uniformly, along the longitudinal direction of the enclosure.

According to one embodiment, the flexible arms and the hooks apply to the guide a force that is directed toward the supporting surfaces. This elastic force ensures optimum retention of the guide in its enclosure.

According to yet another advantageous embodiment of the invention, the supporting surface for supporting the guide forms a ridge directed generally perpendicular to the longitudinal direction of the guide.

According to yet another advantageous embodiment of the invention, the enclosure has a generally U-shaped cross section the opening of which corresponds to a direction in which the light guide is inserted into the enclosure.

According to yet another advantageous embodiment of the invention, the enclosure comprises at least one bearing surface for the guide, the bearing surface being generally arranged in the bottom of the enclosure in the direction of insertion, the surface preferably forming a rib in a plane generally perpendicular to the longitudinal direction of the guide. For preference, the enclosure comprises a plurality of bearing surfaces distributed, preferably uniformly, along the longitudinal direction of the enclosure.

According to some embodiments of the invention, the thickness of the supporting and bearing surfaces is of the order of a few millimeters, preferably comprised between 0.5 mm and 5 mm, more preferably still comprised between 0.5 mm and 3 mm.

Another subject of the invention is a lighting and/or signaling module comprising a support with a longitudinal enclosure and a longitudinal light guide arranged in the enclosure of the support, wherein the support is in accordance with the invention and the guide is in accordance with the invention.

According to one advantageous embodiment of the invention, the module comprises a mask arranged opposite the visible portion of the guide and configured to mask the rib and form a window through which rays leaving the guide can propagate, the rib extending continuously over essentially the entire length of the window.

According to one advantageous embodiment of the invention, the module comprises several windows arranged adjacently along the light guide, the rib of the guide running continuously essentially over the entire length of each of the windows.

Another subject of the invention is a lighting and/or signaling device comprising a module according to the invention.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the aid of the description and drawings among which:

FIG. 4 is a front view of a section of light guide illustrating how the window in a mask and the rib line up in the longitudinal direction; and FIG. 5 is a perspective view of the light guide support of FIG. 1.

DETAILED DESCRIPTION OF THE PREFERRED EMBODIMENTS

The various embodiments illustrated in the figures are deliberately simplified and schematic for the sake of the clarity of the description of the invention. In practice, the various elements that make up the invention may adopt shapes that are significantly more complicated, notably as a result of the various constraints associated with sizing.

In the description that is to follow, terms qualifying the position of certain elements, such as "above", "below", "front", "rear", "in front of", "behind", "horizontal", "vertical", "upper", "lower", etc. refer to the specific arrangements in the figures. However, these terms should not be interpreted in a strict and absolute sense but rather in a relative sense. Specifically, the signaling modules described therein may in practice be oriented differently without in any way departing from the invention.

Figure 1:
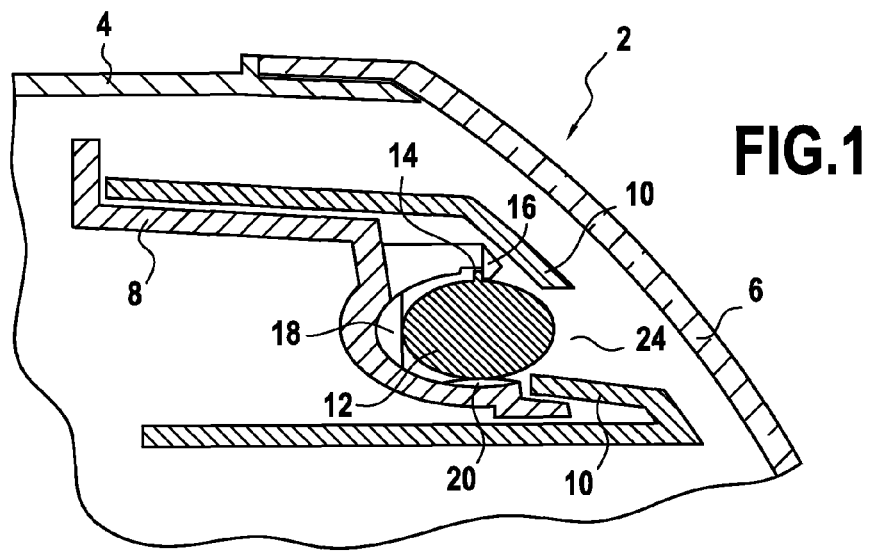
FIG. 1 is a view in cross section of a lighting or signaling device comprising a module with a light guide and a support for the guide which are in accordance with the invention.

Part of a lighting or signaling device 2 has been illustrated in cross section in FIG. 1. This part comprises a signaling module according to the invention. More specifically, the lighting or signaling device 2 comprising a housing 4 and an outer lens 6 contains a signaling module essentially comprising a support 8, a light guide 12 and a mask 10. The light guide 12 is an element that is generally elongate in a longitudinal direction. The latter direction does not have to be rectilinear, quite the opposite, it may be curved. The light guide 12 has a cross section the overall outline of which is closed. The cross section of the light guide 12 is generally constant. Depending on the application though it may vary somewhat along the longitudinal direction of the light guide 12. In the specific case of FIG. 1 (and of FIGS. 2, 3 and 4 which will be described hereinafter), the cross section of the light guide 12 is of oval shape. However, it may adopt various shapes with closed contours such as notably elliptical, circular, rectangular or square shapes, or even more complex shapes still. The light guide 12 is made of a transparent material such as polycarbonate. Other materials may be used, for example polymethyl methacralate PMMA or other suitable transparent polymers.

The light guide 12 is arranged in an enclosure of the support 8. The enclosure comprises a supporting surface 20 opposite a retaining hook 16 collaborating with a rib 14 belonging to the light guide 12. In effect, the light guide 12 has a rib 14 running generally longitudinally along its surface so as to project from the overall outline of its cross section. The enclosure of the support 8 also comprises a bearing surface arranged in the closed end of the enclosure and intended to come into contact with a rear zone 12a of the light guide 12.

The mask 10 placed in front of the light guide 12 is mounted on the support 8. It is intended to mask the support 8 and the zones in which the light guide 12 is mounted on the support 8. It therefore comprises a window intended to let the rays of light emitted by the light guide 12 through to the zone that is to be lit or illuminated.

The light guide 12 is fed with rays of light in a conventional way from one of its ends that forms an input face. In the conventional way it comprises a series of reflective facets 21 (FIG. 2) along the rear zone 12a of its surface, so as to deflect rays passing along it in a transverse direction directed toward the zone that is to be lit or illuminated. These deflected rays pass through the window 24 of the mask 10.

Figure 2:
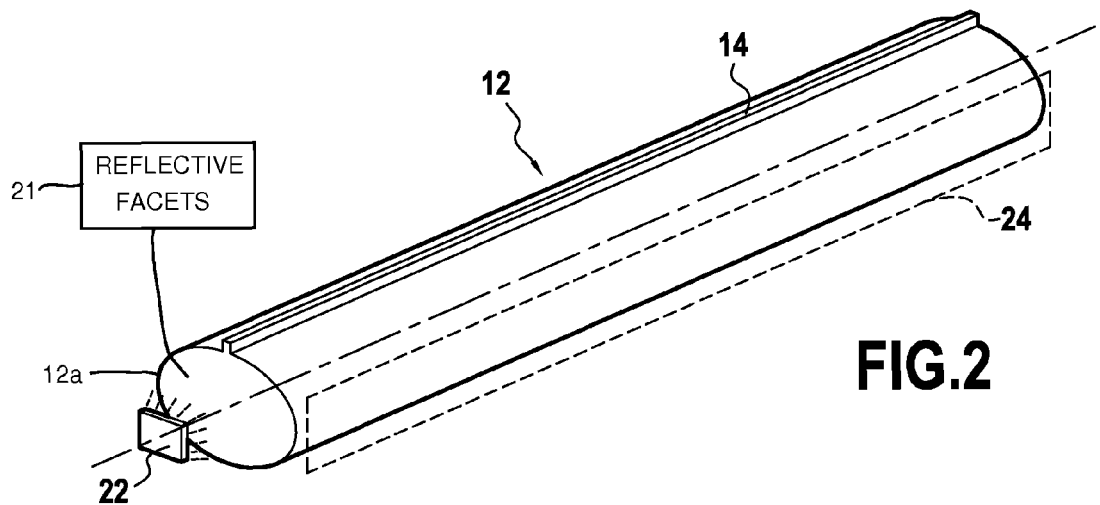
FIG. 2 is a perspective view of a first embodiment of a light guide according to the invention.

A first embodiment of the light guide 12 according to the invention is illustrated in FIG. 2. The light guide 12 illustrated is rectilinear for the sake of the clarity of the description, on the understanding that it may be curved. A light source 22 such as, for example, of the light-emitting diode type, has been illustrated facing the input face of the light guide 12. The rib 14 extends over the entire useful length of the light guide 12, this useful length essentially corresponding at least to the length of the window in the mask, which is illustrated by the rectangle 24. This is because, since the purpose of the rib 14 is to act as a zone for the attachment of the light guide 12, it is important for this rib 14 to extend over most of the length of the visible zone of the light guide 12 so as to avoid generating any non-uniformity in the appearance of the visible zone when the light guide 12 is illuminated. Because of the transparent very nature of the material of the light guide 12 and because of the phenomenon of successive reflections off the diopter formed by its exterior surface with the ambient air, the rib 14 is able to guide the rays of light that pass along the light guide 12, and potentially cause some of them to leave the light guide 12 in a direction transverse to the longitudinal direction of the light guide 12. Such rays are caught by the mask 10 so that they are not visible from outside the lighting or signaling device 2. A break in the rib 14 could generate a non-uniformity in the visible part of the light guide 12. It is therefore beneficial for this rib 14 to extend continuously over most of the length of the window 24 of the mask 10.

Figure 3:
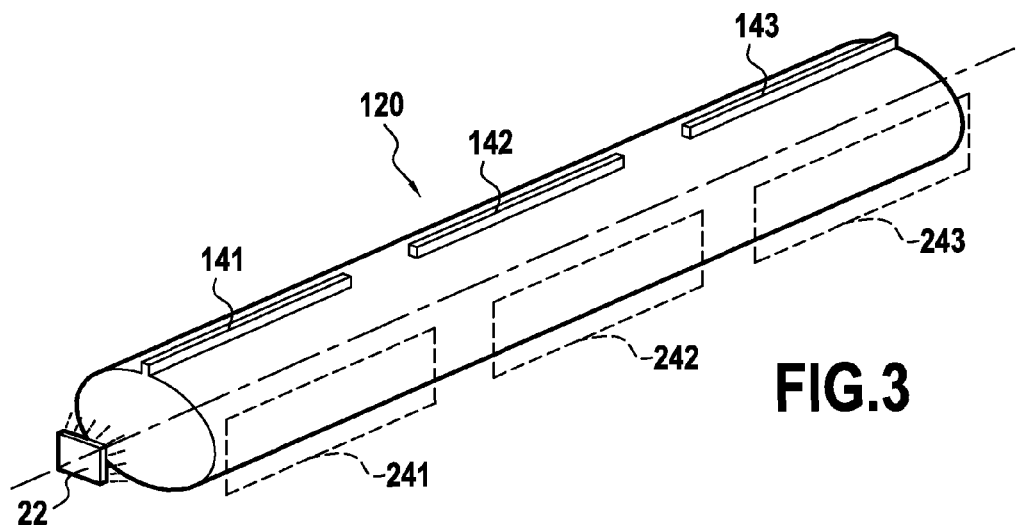
FIG. 3 is a perspective view of a second embodiment of a light guide according to the invention.

A second embodiment is illustrated in FIG. 3. In a similar way to what was mentioned in respect of FIG. 2, the light guide 120 illustrated is rectilinear for the sake of clarity, it being understood that it could be curved. A light source 22 such as, for example, of the light-emitting diode type is illustrated facing the input face of the light guide 120. The light guide 120 comprises a series of continuous ribs 141, 142 and 143. A window 241, 242 and 243 is arranged in front of each of the ribs 141, 142 and 143. Each of these ribs 141, 142 and 143 extends over at least approximately the entire length of the corresponding window 241,242 or 243, for the same reasons as were given hereinabove in relation to FIG. 2. The various ribs 141, 142 and 143 are preferably aligned. However, they may exhibit a certain offset without thereby generating any lack of uniformity.

In general, the rib 14, 141, 142, 143 has a generally rectangular cross section so as to form a contact surface able to retain the light guide 12, 120 in the enclosure in the support 8. The dimensions of the cross section of the rib 14, 141, 142, 143 are of the order of 1 millimeter. The height of the rib 14, 141, 142, 143 is typically of the order of 1 mm. However, it may be comprised between 0.5 mm and 3 mm. The same is true of the width.

FIG. 4 is a front-on view of a portion of light guide 12 and of a window 24 defining the visible zone of the portion of light guide 12. It may be seen that the window 24 has a length L and that the continuous rib 14 has a length l. For preference and contrary to what has been illustrated in FIG. 4, the length l of the rib 14 is greater than or equal to the length L of the window and the rib 14 extends over the entire length L of the window 24. This is because in this way, any non-uniformities that could be generated by breaks in the rib 14 are completely masked by the mask. Depending on the actual distance between the mask 10 and the light guide 12 and, more particularly, the rib 14, it may be beneficial to have the rib 14 protrude beyond the corresponding edge of the window 24 so as to guard against any problem of non-uniformity if the module is observed from a direction that is transverse to the main direction of lighting or illumination of the module. Such protrusion could be of the order of a few millimeters.

Depending on the size and shape of the rib 14, a break therein could have a very small influence on the uniformity of the visible part of the light guide 12. The non-uniformity may prove to be visible only a certain distance away from the break in the rib 14. In that case, the length l of the rib 14 may possibly be slightly shorter than the length L of the window 24 as has been illustrated in FIG. 4. The zones of the window 24 that correspond to an absence of rib 14 have, on each side of the rib 14, lengths $l_1$ and $l_2$. These lengths $l_1$ and $l_2$ may therefore be of the order of a few millimeters.

In general, it should be noted that the window or windows formed by the mask or masks 10 are configured to have a height slightly shorter than the height of the light guide 12 and included within the height of the light guide 12, so as to mask the guide attachment zones properly. This situation is clearly visible in FIG. 1 and in FIG. 4. The lower and upper edges of the window or windows 24 are therefore set back from the upper and lower edges of the light guide 12. This setback is not compulsory but preferred. It is of course dependent on the size of the light guide 12 and is of the order of a few percent of the height of the light guide 12. For preference it is comprised between 1% and 20% of the height of the light guide 12, more preferably between 1% and 15%, and more preferably still, between 3% and 10%.

The support 8 for the signaling module of FIG. 1 is illustrated in perspective in FIG. 5. There, the enclosure in the overall shape of a U intended to accept the light guide 12 can be clearly seen. In order to avoid excessively large contact surfaces for the contact between the light guide 12 and the enclosure, the latter comprises a series of generally horizontal and transverse supporting surfaces 20 distributed along its longitudinal direction. Each of these supporting surfaces 20 forms a ridge on the surface of the enclosure. For preference, each of these supporting surfaces 20 is arranged facing an arm 26 and retaining hook 16. For preference, each of these supporting surfaces 20 has a front part that is inclined so as to guide the light guide 12 and make it easier to insert into its enclosure.

Bearing surfaces 18 in the form of ribs are arranged along the closed end of the enclosure to bear the rear zone 12a of the light guide 12. Creating these in the form of ribs means that the contact surfaces for contact with the light guide 12 can be minimized while at the same time ensuring very stable attachment. For preference, each of these surfaces is aligned with the corresponding supporting surface 20 and/or the corresponding flexible arm 26 and hook 16. The thickness of the supporting surfaces 20 and bearing surfaces 18 is of the order of a few millimeters, preferably comprised between 0.5 mm and 5 mm, more preferably still comprised between 0.5 mm and 3 mm.

Each flexible arm 26 comprises a hook 16 and a flexible zone able to allow the hook 16 to move as the light guide 12 is being inserted into its enclosure. Each hook 16 comprises a catching surface for catching on the rib 14 of the light guide 12, this surface being generally perpendicular to the direction in which the enclosure is open which direction essentially corresponds to the direction in which the light guide 12 is inserted into the enclosure. This surface thus forms a positive-contact surface for positive contact with the front surface of the rib 14 of the light guide 12. Each hook 16 also comprises a front surface that is inclined with respect to the direction in which the light guide 12 is inserted into the enclosure, this surface being intended to collaborate with the upper surface of the rib 14 of the light guide 12. This front surface of the hook 16 is inclined so that the force of inserting the light guide 12 in the direction of insertion generates a perpendicular component directed away from the enclosure, this component allowing the arm 26 to flex and allowing the light guide 12 to be inserted further until the front surface leaves the upper surface of the rib 14 and until the contact surface is positioned in front of the front surface of the rib 14, thus retaining the light guide 12 in its enclosure.

For preference, the flexible arms 26 and the hooks 16 apply a force to the light guide 12 that is directed toward the supporting surfaces. This elastic force ensures optimal retention of the light guide 12 in its enclosure.

It should be noted that the positive-contact surfaces for contact with the rib 14 may adopt shapes other than those illustrated in FIGS. 1 and 5. The presence of flexible arms 26 is not compulsory. By way of example, it is in fact conceivable to provide one or more mobile elements supporting the contact surfaces, this or these mobile elements for example being able to be locked in a closed position in which the contact surfaces collaborate by engaging with the rib or ribs 14 of the light guide 12.

The support 8 is preferably made of molded plastic, for example polyoxymethylene (or polyformaldehyde) which is a polymer also known as POM according to the ISO standard.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A support for optical light guide of a lighting and/or signaling device for a vehicle, comprising a longitudinal enclosure able to receive said optical light guide, wherein said optical light guide has a longitudinal direction and a cross section forming a closed general outline;

said optical light guide being made of a transparent material able to form a diopter with its environment and able to transmit and guide rays of light by multiple reflection off said diopter;

said optical light guide comprising at least one visible portion with means able to reflect transversally some of the rays passing along it so as to cause them to leave said optical light guide;

wherein said optical light guide comprises at least one longitudinal rib on said at least one visible portion of said optical light guide, projecting from a general outline, said at least one longitudinal rib being intended to collaborate with a support so that said optical light guide can be attached to said support;

said support comprises retaining means for holding said optical light guide in said longitudinal enclosure able to collaborate with said at least one longitudinal rib of said optical light guide;

wherein said longitudinal enclosure has a generally U-shaped cross section defining an opening for receiving said at least one longitudinal rib and that corresponds to a direction in which said optical light guide is inserted into said longitudinal enclosure; and wherein said support comprises at least one supportive surface that forms a ridge on said longitudinal enclosure that generally opposes said retaining means, said at least one supportive surface engaging said optical light guide to secure said optical light guide in said longitudinal enclosure.

2. The support according to claim 1, wherein said at least one longitudinal rib is continuous along a length thereof, said retaining means comprises at least one positive-contact surface for positive contact with said at least one longitudinal rib able to hold said optical light guide in said longitudinal enclosure;

wherein said retaining means is adapted to reflect some of the rays transversally and comprises a succession of reflective facets distributed longitudinally over a rear part of a surface of said at least one visible portion of said optical light guide, the rays leaving said optical light guide via a front part of said surface, said at least one longitudinal rib being positioned on the overall outline of said optical light guide in such a way as to be between said rear part and the visible part;

wherein said at least one longitudinal rib has a generally quadrilateral-shaped overall section;

wherein said at least one longitudinal rib is formed integrally with said optical light guide.

3. The support according to claim 2, wherein said retaining means comprise at least one arm supporting said positive-contact surface.

4. The support according to claim 3, wherein said at least one arm comprises a contact surface for contact with said at least one longitudinal rib of said optical light guide as it is being inserted into said longitudinal enclosure, said surface being inclined with respect to an overall direction in which said optical light guide is inserted so as to allow said at least one arm to move as said optical light guide is being inserted into said longitudinal enclosure so that said positive-contact surface can engage with said at least one longitudinal rib.

5. The support according to claim 3, wherein said support comprises a series of arms distributed along the longitudinal direction of said longitudinal enclosure.

6. The support according to claim 3, wherein said at least one arm comprises a hook and a flexible zone able to allow said hook to move as said optical light guide is being inserted into its longitudinal enclosure, said hook comprising a catching surface that catches on said at least one longitudinal rib of said optical light guide.

7. The support according to claim 1, wherein said longitudinal enclosure comprises at least one supporting surface for said optical light guide, said at least one supporting surface being generally opposite said retaining means for retaining said optical light guide.

8. The support according to claim 7, wherein said at least one supporting surface for supporting said optical light guide forms a ridge directed generally perpendicular to the longitudinal direction of said optical light guide.

9. The support according to claim 1, wherein said longitudinal enclosure has a generally U-shaped cross section the opening of which corresponds to a direction in which said optical light guide is inserted into said longitudinal enclosure.

10. The support according to claim 9, wherein said longitudinal enclosure comprises at least one bearing surface for said optical light guide, said at least one bearing surface being generally arranged in the bottom of said longitudinal enclosure in the direction of insertion.

11. The support according to claim 10, wherein said at least one bearing surface forms said at least one longitudinal rib in a plane generally perpendicular to the longitudinal direction of said optical light guide.

12. A lighting and/or signaling device for a vehicle comprising a support with a longitudinal enclosure and a longitudinal optical light guide arranged in said longitudinal enclosure of said support, wherein said support comprises retaining means for holding said longitudinal optical light guide in said longitudinal enclosure able to collaborate with a rib of said longitudinal optical light guide and said longitudinal optical light guide has a longitudinal direction and a cross section forming a closed general outline;

said longitudinal optical light guide being made of a transparent material able to form a diopter with its environment and able to transmit and guide rays of light by multiple reflection off said diopter;

said longitudinal optical light guide comprising at least one visible portion with means able to reflect transversally some of the rays passing along it so as to cause them to leave said longitudinal optical light guide;

wherein said longitudinal optical light guide comprises at least one longitudinal rib on said at least one visible portion of said longitudinal optical light guide, projecting from a general outline, said at least one longitudinal rib being intended to collaborate with said support so that said longitudinal optical light guide can be attached to said support; and wherein said support comprises at least one supportive surface that forms a ridge on said longitudinal enclosure that generally opposes said retaining means, said at least one supportive surface engaging said longitudinal optical light guide to secure said longitudinal optical light guide in said longitudinal enclosure.

13. The lighting and/or signaling module according to claim 12, wherein said lighting and/or signaling module comprises a mask arranged opposite said at least one visible portion of said longitudinal optical light guide and configured to mask said at least one longitudinal rib and form a window through which rays leaving said longitudinal optical light guide can propagate, said at least one longitudinal rib extending continuously over essentially the entire length of the window.

* * * * *